US012585593B2

(12) United States Patent
Cadigan, Jr. et al.

(10) Patent No.: US 12,585,593 B2
(45) Date of Patent: Mar. 24, 2026

(54) PROCESSOR CROSS-CORE CACHE LINE CONTENTION MANAGEMENT

(71) Applicant: International Business Machines Corporation, Armonk, NY (US)

(72) Inventors: Michael Joseph Cadigan, Jr., Poughkeepsie, NY (US); Gregory William Alexander, Pflugerville, TX (US); Deanna Postles Dunn Berger, Hyde Park, NY (US); Timothy Bronson, Round Rock, TX (US); Chung-Lung K. Shum, Wappingers Falls, NY (US); Aaron Tsai, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 17/934,731

(22) Filed: Sep. 23, 2022

(65) Prior Publication Data

US 2024/0104021 A1    Mar. 28, 2024

(51) Int. Cl.
 *G06F 12/0891* (2016.01)
 *G06F 12/0811* (2016.01)
(52) U.S. Cl.
 CPC ...... *G06F 12/0891* (2013.01); *G06F 12/0811* (2013.01)
(58) Field of Classification Search
 CPC .......................... G06F 12/0981; G06F 12/0811
 USPC ......................................................... 711/135
 See application file for complete search history.

(56) References Cited

U.S. PATENT DOCUMENTS

| | | | | |
|---|---|---|---|---|
| 7,366,847 B2 * | 4/2008 | Kruckemyer | ......... | G06F 12/082 |
| | | | | 711/144 |
| 8,195,892 B2 | 6/2012 | Kornegay et al. | | |
| 8,209,490 B2 * | 6/2012 | Mattina | ................. | G06F 12/084 |
| | | | | 711/121 |
| 8,285,926 B2 * | 10/2012 | Karlsson | ............. | G06F 12/0855 |
| | | | | 711/E12.024 |
| 8,812,793 B2 | 8/2014 | Kornegay et al. | | |
| 9,311,238 B2 | 4/2016 | Shum et al. | | |
| 9,563,467 B1 | 2/2017 | Gschwind et al. | | |
| 9,921,964 B2 | 3/2018 | Shum et al. | | |
| 9,921,965 B2 | 3/2018 | Shum et al. | | |

(Continued)

OTHER PUBLICATIONS

Honarmand, N.; Beyond ILP—In Search of More Parallelism, 2016, 78 pages.

(Continued)

*Primary Examiner* — Christopher B Shin
(74) *Attorney, Agent, or Firm* — Teddi E. Maranzano

(57) ABSTRACT

Embodiments are for processor cross-core cache line contention management. A computer-implemented method includes sending a cross-invalidate command to one or more caches based on receiving a cache state change request for a cache line in a symmetric multiprocessing system and determining a retry delay based on receiving a cross-invalidate reject response from at least one of the one or more caches. The computer-implemented method also includes waiting until a retry delay period associated with the retry delay has elapsed to resend the cross-invalidate command to the one or more caches and granting the cache state change request for the cache line based on receiving a cross-invalidate accept response from the one or more caches.

20 Claims, 10 Drawing Sheets

(56) References Cited

U.S. PATENT DOCUMENTS

| | | | |
|---|---|---|---|
| 9,971,629 B2 | 5/2018 | Bradbury et al. | |
| 10,795,824 B2 | 10/2020 | Berger et al. | |
| 10,970,215 B1 * | 4/2021 | Williams | G06F 12/0877 |
| 2002/0083271 A1 * | 6/2002 | Mounes-Toussi | |
| | | | G06F 12/0808 |
| | | | 711/138 |
| 2009/0240889 A1 * | 9/2009 | Choy | G06F 12/0815 |
| | | | 711/E12.024 |
| 2018/0067856 A1 * | 3/2018 | Walker | G06F 12/0871 |
| 2018/0365164 A1 * | 12/2018 | Helms | G06F 12/0875 |
| 2019/0108126 A1 * | 4/2019 | Bartik | G06F 12/0815 |
| 2019/0146916 A1 * | 5/2019 | Matsakis | G06F 12/084 |
| | | | 711/130 |
| 2023/0161703 A1 * | 5/2023 | Wang | G06F 12/0811 |
| | | | 711/122 |

OTHER PUBLICATIONS

Lemeire, J.; Practical Parallel Programming—Shared Memory Systems, 2019-2020, 128 pages.
Moshovos, A. et al.; Jetty: Filtering Snoops for Reduced Energy Consumption in SMP Servers, 2001, 12 pages.
Anonymous. "Implementing locks in a shared-memory multiprocessor using a simplified coherence protocol." Published Sep. 24, 2010 by IP.com. 6 pages.
Anonymous. "Speculative Cache Data Read." Published Jun. 19, 2012 by IP.com. 3 pages.
Anonymous, "Recovery of core in case of persistent cache error," An IP.com Prior Art Database Technical Disclosure, IP.com No. IPCOM000240409D, Jan. 29, 2015 (4 pages).

* cited by examiner

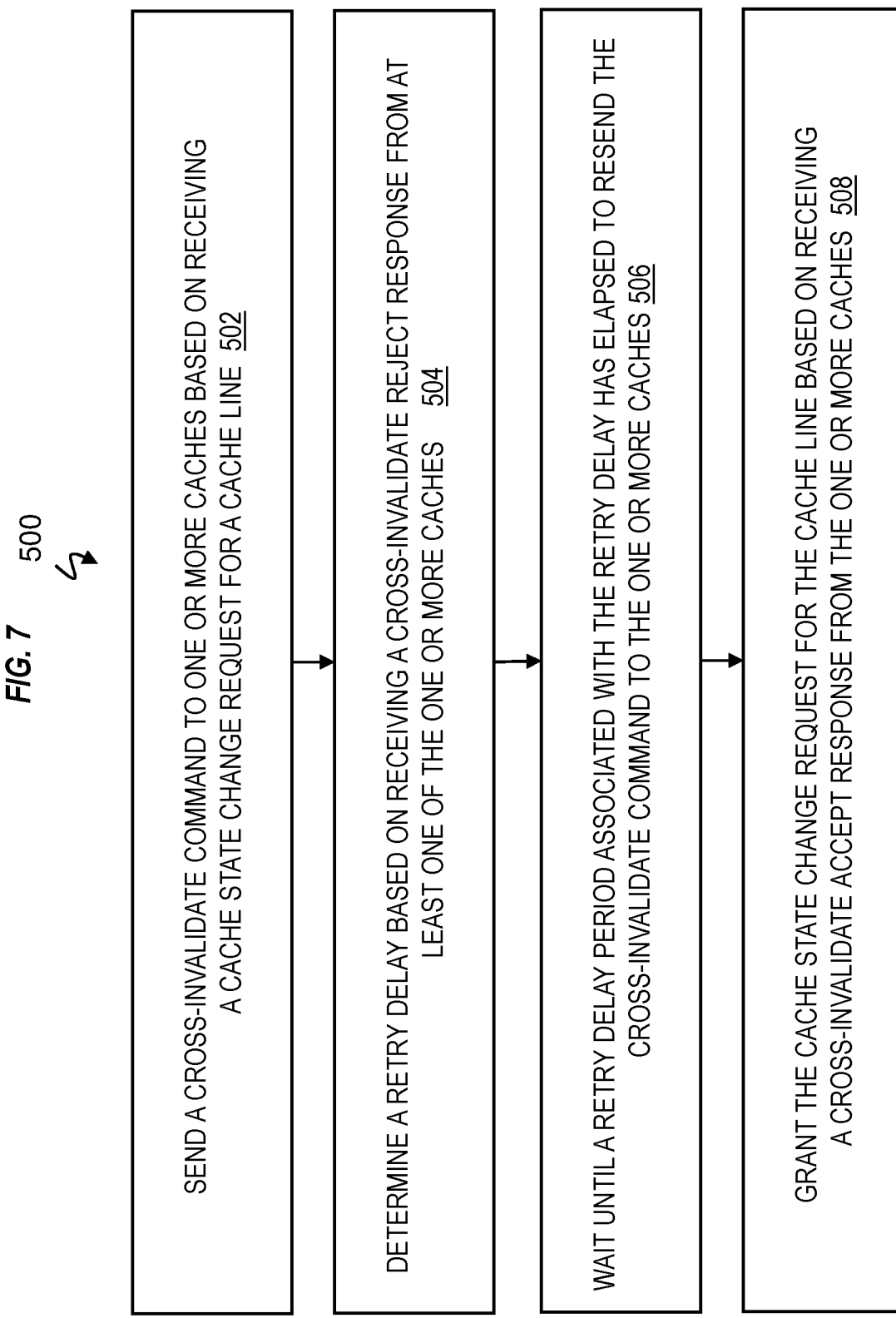

SEND A CROSS-INVALIDATE COMMAND TO ONE OR MORE CACHES BASED ON RECEIVING A CACHE STATE CHANGE REQUEST FOR A CACHE LINE 502

DETERMINE A RETRY DELAY BASED ON RECEIVING A CROSS-INVALIDATE REJECT RESPONSE FROM AT LEAST ONE OF THE ONE OR MORE CACHES 504

WAIT UNTIL A RETRY DELAY PERIOD ASSOCIATED WITH THE RETRY DELAY HAS ELAPSED TO RESEND THE CROSS-INVALIDATE COMMAND TO THE ONE OR MORE CACHES 506

GRANT THE CACHE STATE CHANGE REQUEST FOR THE CACHE LINE BASED ON RECEIVING A CROSS-INVALIDATE ACCEPT RESPONSE FROM THE ONE OR MORE CACHES 508

*FIG. 8*  600

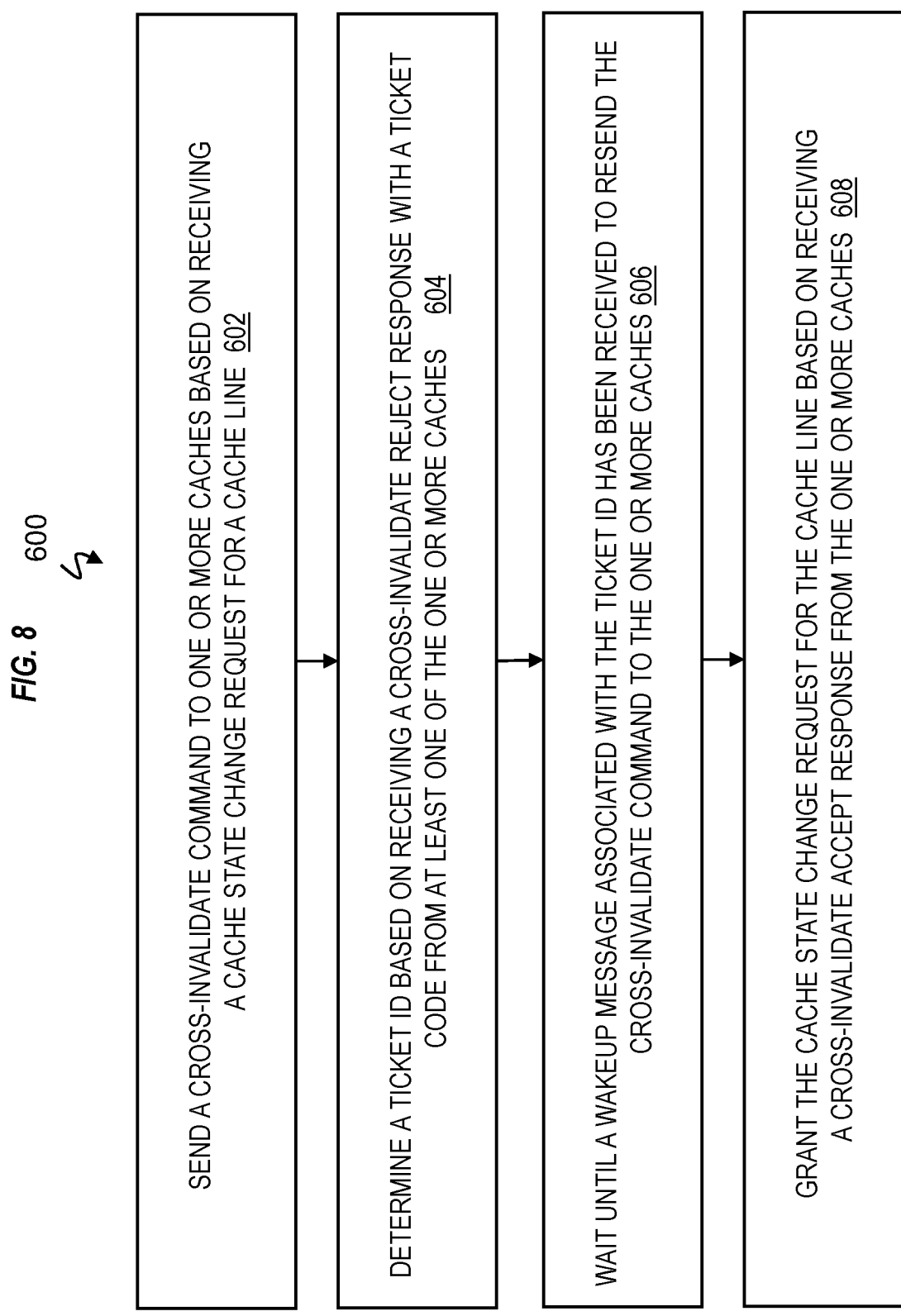

SEND A CROSS-INVALIDATE COMMAND TO ONE OR MORE CACHES BASED ON RECEIVING A CACHE STATE CHANGE REQUEST FOR A CACHE LINE  602

DETERMINE A TICKET ID BASED ON RECEIVING A CROSS-INVALIDATE REJECT RESPONSE WITH A TICKET CODE FROM AT LEAST ONE OF THE ONE OR MORE CACHES  604

WAIT UNTIL A WAKEUP MESSAGE ASSOCIATED WITH THE TICKET ID HAS BEEN RECEIVED TO RESEND THE CROSS-INVALIDATE COMMAND TO THE ONE OR MORE CACHES  606

GRANT THE CACHE STATE CHANGE REQUEST FOR THE CACHE LINE BASED ON RECEIVING A CROSS-INVALIDATE ACCEPT RESPONSE FROM THE ONE OR MORE CACHES  608

*FIG. 9*
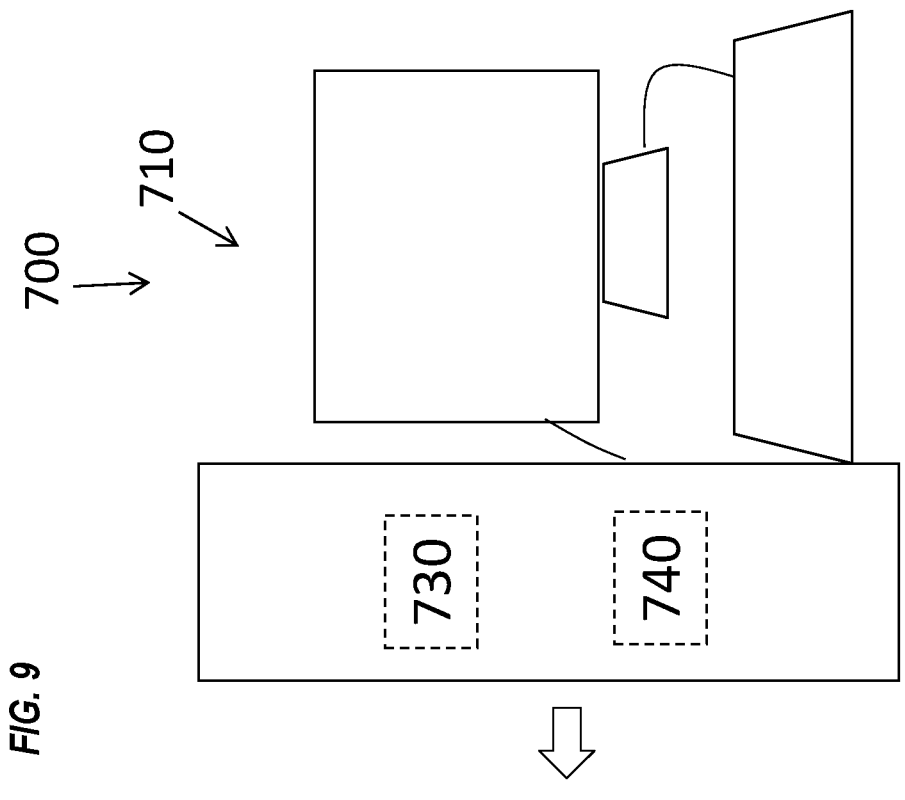
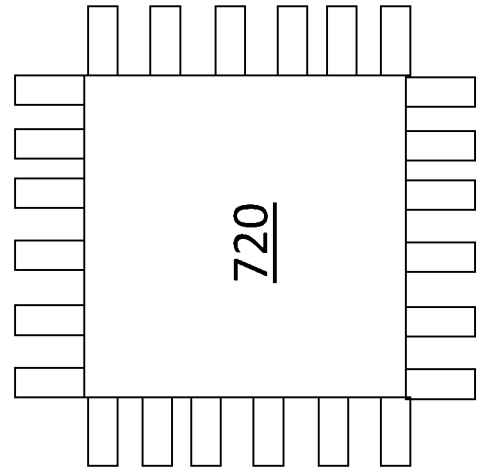

*FIG. 10*

810 fabricate masks for lithography 820 fabricate wafer and dice 830 test and sort each die

720

PROCESSOR CROSS-CORE CACHE LINE CONTENTION MANAGEMENT

BACKGROUND

The present invention generally relates to computer systems, and more specifically, to computer-implemented methods, computer systems, and computer program products configured and arranged for processor cross-core cache line contention management.

In computing environments that have multiple processor chips on the same drawers and/or processor chips in other drawers sharing one or more caches, those processor chips may have access to the same cache lines. A cache line or line is a portion of data of a specific size (e.g., 256 bytes), which fits into a single cache entry in a cache. Coherency is managed on a cache line granularity as data is transferred between memory and a cache and between caches. To ensure coherency of a cache line, snoop requests (also referred as snoops or cross invalidate requests) are used. Snoop requests are processed by receiving a snoop request from a requesting cache, determining if this cache has a copy of the cache line in an appropriate state, sending the cache line to the requesting cache, and updating the state of the cache line in the cache.

A cache structure and its related services provide processor chips with data consistency of shared data. Many processor chips on the same drawer and/or processor chips on different drawers may attempt to access the same cache line. Techniques are needed to improve access to a cache line of a shared cache when exclusive access to the cache line is requested.

SUMMARY

Embodiments of the present invention are directed to computer-implemented methods for processor cross-core cache line contention management. A non-limiting computer-implemented method includes sending a cross-invalidate command to one or more caches based on receiving a cache state change request for a cache line in a symmetric multiprocessing system and determining a retry delay based on receiving a cross-invalidate reject response from at least one of the one or more caches. The computer-implemented method also includes waiting until a retry delay period associated with the retry delay has elapsed to resend the cross-invalidate command to the one or more caches and granting the cache state change request for the cache line based on receiving a cross-invalidate accept response from the one or more caches.

Embodiments of the present invention are directed to systems for processor cross-core cache line contention management. A non-limiting system includes a plurality of processors each including two or more cores forming a symmetric multiprocessing system, a cache system, and a controller coupled to the cache system. The controller is configured to send a cross-invalidate command to one or more caches of the cache system based on receiving a cache state change request for a cache line, determine a retry delay based on receiving a cross-invalidate reject response from at least one of the one or more caches, wait until a retry delay period associated with the retry delay has elapsed to resend the cross-invalidate command to the one or more caches, and grant the cache state change request for the cache line based on receiving a cross-invalidate accept response from the one or more caches.

Embodiments of the present invention are directed to computer-implemented methods for processor cross-core cache line contention management. A non-limiting computer-implemented method includes sending a cross-invalidate command to one or more caches based on receiving a cache state change request for a cache line in a symmetric multiprocessing system and determining a ticket identifier based on receiving a cross-invalidate reject response with a ticket code from at least one of the one or more caches. The computer-implemented method also includes waiting until a wakeup message associated with the ticket identifier has been received to resend the cross-invalidate command to the one or more caches and granting the cache state change request for the cache line based on receiving a cross-invalidate accept response from the one or more caches.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram illustrating an example of processor cross-core cache line contention management between two L1 caches according to one or more embodiments of the present invention;

FIG. 7 is a flowchart of a computer-implemented process to provide processor cross-core cache line contention management according to one or more embodiments of the present invention;

FIG. 8 is a flowchart of a computer-implemented method to provide processor cross-core cache line contention management using a ticket system according to one or more embodiments of the present invention;

FIG. 9 is a block diagram of a system to design/layout of an integrated circuit (IC) including processor cross-core cache line contention management in an IC in accordance with one or more embodiments of the present invention; and FIG. 10 is a process flow of a method of fabricating the IC of FIG. 9 in accordance with one or more embodiments of the present invention.

DETAILED DESCRIPTION

Figure 1:
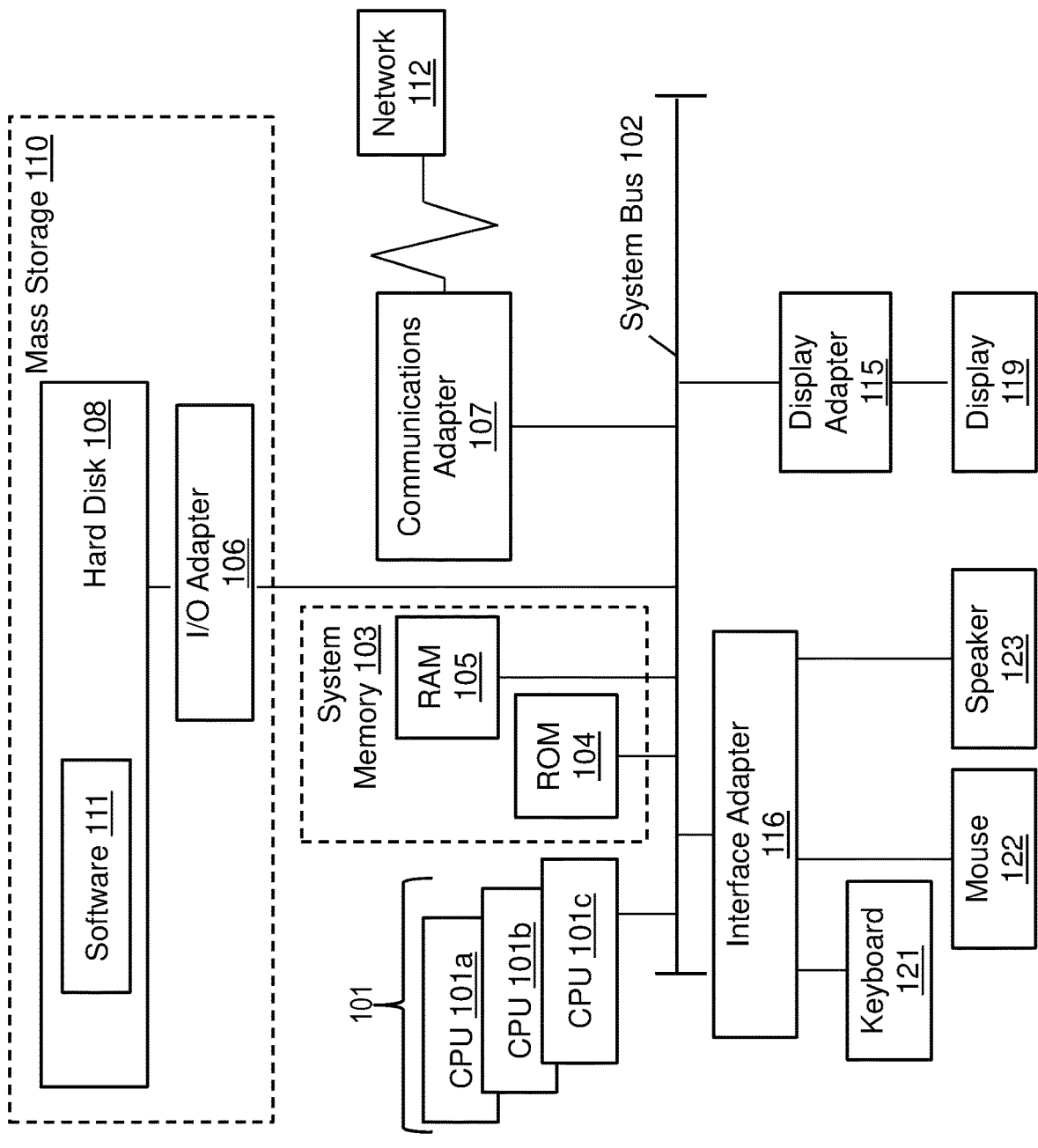
FIG. 1 depicts a block diagram of an example computer system for use in conjunction with one or more embodiments of the present invention.

One or more embodiments of the invention are configured to provide processor cross-core cache line contention management. One or more embodiments of the invention provide a technique for maintaining cache coherency while reducing delays associated with cache line contention.

A hot line or hot cache line is a cache line that numerous operations, as requestors, are trying to access to observe and/or to modify. Cache lines can only be modified by one operation a time. When there are multiple requests to access the cache line, there can be a backlog of operations that are waiting to access the cache line as another operation is working on the cache line. Unsuccessful requestors, those who have requested the cache line and did not get access to the cache line, are rejected back to origin and must start the requesting process over again. A level-one (L1) cache in a cache hierarchy is private storage per core in a multi-core processing system. Lower level cache, e.g., level-two (L2) and above, can be split, shared or virtualized. Lower-level caches (e.g., L2, L3) are typically larger, have longer access latencies, and may be shared across more processor cores, whereas higher-level caches (e.g., L1) are typically smaller, have shorter access latencies, and are shared among fewer processor cores or not shared at all. The designation of lower-level and higher-level caches can be relatively defined, such as L2 cache being a higher-level cache relative to L3 but a lower-level cache relative to L1. L1 caches in a system can have multiple copies of a cache line in a read-only state, but the cache line can only be updated by an L1 cache in an exclusive (writeable) state. When an L1 cache requests that a cache line be put into an exclusive state, a cache controller that enforces cache coherency can send a cross-invalidate command (XI) to other L1 caches to inform the other L1 caches of the request and that the local copies of the cache line will become invalid upon the update. Typically, the cache controller waits for the other L1 caches to acknowledge the cross-invalidate command with a cross-invalidate accept response. However, one or more of the L1 caches may already be in process of making an update or have the cache line locked, and thus may respond with a cross-invalidate reject response. Upon receiving the cross-invalidate reject response, the controller may continue to repeat sending the cross-invalidate command until acknowledgements are received, and the requesting L1 cache can be granted the exclusive state. This process can result in delays and inefficiencies as the controller does not have visibility into when the cross-invalidate command will be accepted and may continue to repeatedly send the cross-invalidate command.

Accordingly, one or more embodiments of the invention provide processor cross-core cache line contention management to reduce excess cross-invalidate commands from being repeatedly broadcast. As technical solutions and benefits, in one or more embodiments a cache that receives a cross-invalidate command and plans to reject the cross-invalidate command also provides an indication to assist the controller in determining when to resend the cross-invalidate command. As one example, the cache can send a cross-invalidate reject with an encoded value that indicates how long the controller should wait before retrying the cross-invalidate command. As another example, the cache can send a cross-invalidate reject with a ticket code indicating that the controller should wait until receiving a wakeup message associated with the ticket code before retrying the cross-invalidate command. Other variations are contemplated, such as early termination of a retry delay period.

For the sake of brevity, conventional techniques related to semiconductor device and IC fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
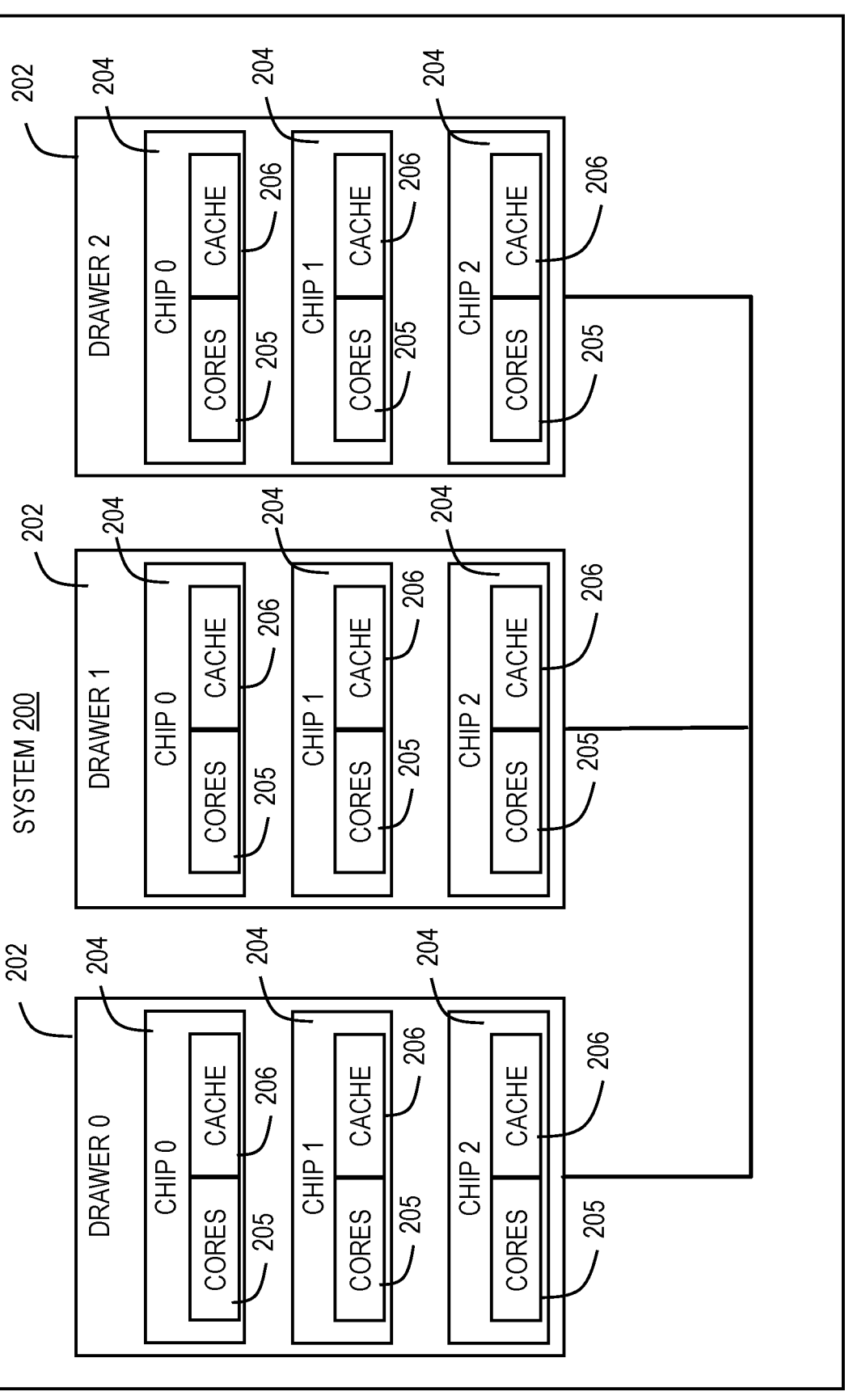
FIG. 2 depicts a block diagram of an example system configured to provide processor cross-core cache line contention management according to one or more embodiments of the present invention.

FIG. 2 depicts a block diagram of an example system 200 configured to provide processor cross-core cache line contention management according to one or more embodiments of the invention. In system 200, there can be many interconnected drawers 202, such as drawer 0, drawer 1, and drawer 2. Each of the drawers 202 includes processor chips 204, such as processor chip 0, processor chip 1, and processor chip 2. Each processor chip 204 includes two or more cores 205 and cache 206. The cache 206 can be implemented in a cache hierarchy where each of the cores 205 includes an L1 cache, and an L2 cache is shared between two or more of the cores 205. Lower levels of the cache 206 (e.g., level three (L3) caches) can be shared across the system 200. The computer system 100 of FIG. 1 may be integrated with and/or use processor chips 204 of FIG. 2. Many computer systems 100 and/or features of computer systems 100 may be integrated in system 200. One or more processors 101 of FIG. 1 may represent processor chips 204. The processor chips 204 include processing circuitry, and the cache 206 can include memory and circuitry as understood by one of ordinary skill in the art. The system 200 can be implemented as a symmetric multiprocessing system, where coherency is maintained for shared resources, such as shared lines of the cache 206 within and across the drawers 202.

Figure 3:
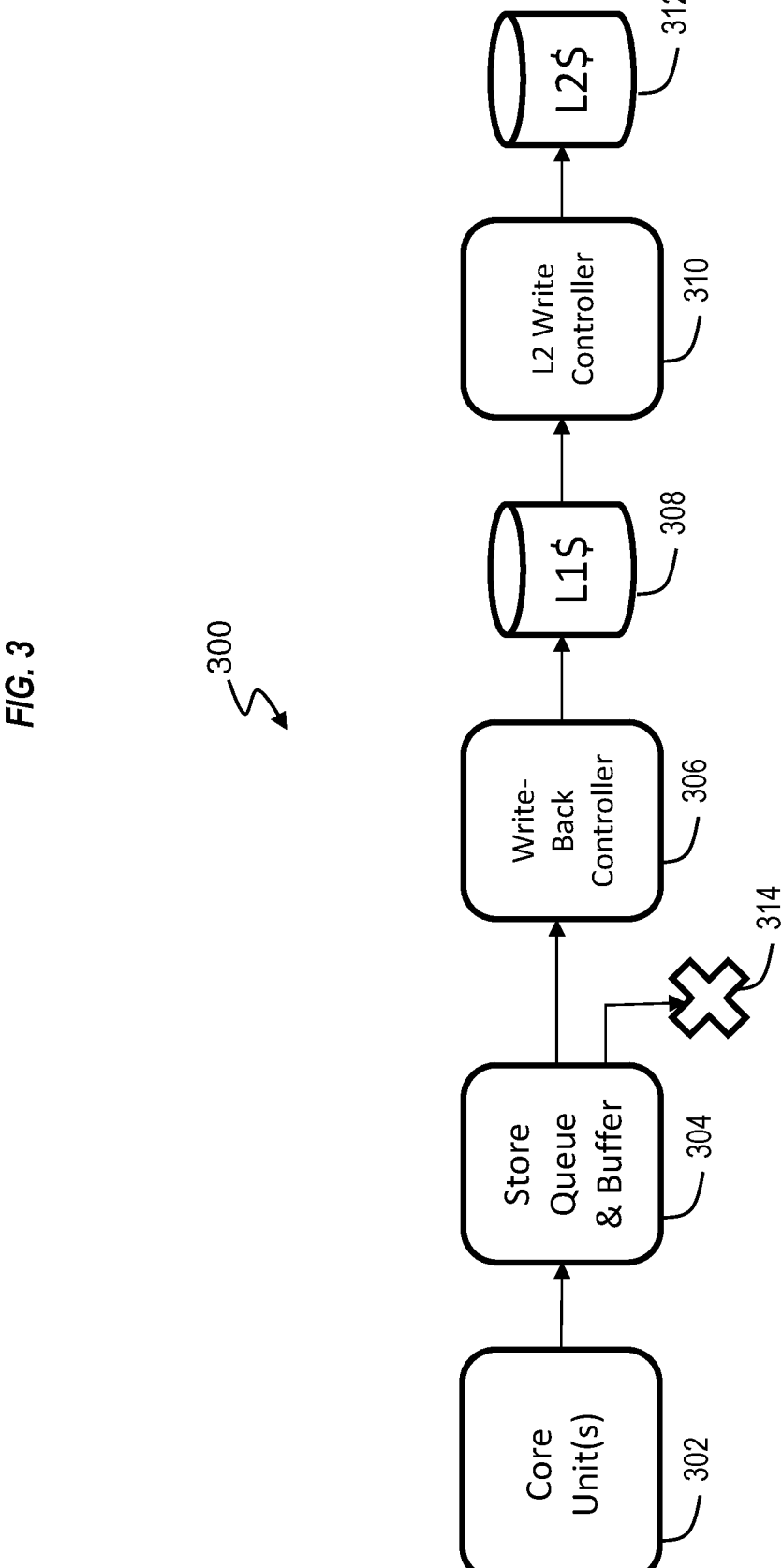
FIG. 3 depicts a block diagram of a cache line update according to one or more embodiments of the present invention.

FIG. 3 depicts a block diagram 300 of a cache line update according to one or more embodiments of the invention. In the example of FIG. 3, one or more core units 302 within a core, such as the cores 205 of FIG. 2, can initiate an update to a value in memory while processing a storage updating instruction (e.g. a STORE IMMEDIATE). The core units 302 can be arithmetic units or other such units that result in generating an updated value in the store queue and buffer 304, intended to update storage through L1 cache 308. After being queued in the store queue and buffer 304, the updated value can be sent to a writeback controller 306 which controls updating of cache lines stored in L1 cache 308. To propagate the update to the L1 cache 308 to other shared locations within the system 200 of FIG. 2 and maintain cache coherency, the updated cache line in the L1 cache 308 is sent to an L2 cache write controller 310 that performs the cache line update to an L2 cache 312. The L1 cache 308 may be local to a core, such as one of the cores 205 of FIG. 2, and the L2 cache 312 may be shared between multiple cores, such as multiple cores 205 in the same processor chip 204. Thus, the cache 206 of a processor chip 204 can include both the L1 cache 308 and the L2 cache 312. In order for the L2 cache write controller 310 to make the update to the L2 cache 312 with a cache line from the L1 cache 308, the L1 cache 308 requests exclusive access to the cache line in the L2 cache 312. This can be performed by the L2 cache write controller 310 issuing a cross-invalidate command to other L1 caches of other cores 205 in the same processor chip 204 and in other processor chips 204 of the system 200 of FIG. 2.

According to one or more embodiments, a feedback mechanism can be implemented in logic of the L2 cache write controller 310, for example, to determine how long to delay upon receiving a cross-invalidate reject response from at least one of the one or more other L1 caches. Logic in each of the cores 205 can determine where within the write and update pipeline a cache line update has advanced to before determining how long it will likely take for a cross-invalidate command to be accepted. For instance, in the context of FIG. 3, an update to the L1 cache 308 that would result in a corresponding cache line update to the L2 cache 312 may receive a cross-invalidate command from the L2 cache write controller 310 that was initiated from another L1 cache seeking to update the same cache line. If the cache line update writing to the L2 cache 312 is currently in process, there may be a relatively short delay before completion where the cross-invalidate command would be accepted. If the update has been made to the L1 cache 308 but has not yet propagated to the L2 cache write controller 310, then the amount of time to complete the write to the L2 cache 312 would be longer. If the update has reached the writeback controller 306 but has not reached the L1 cache 308, then a longer delay would be needed. If the cache line is in the store queue and buffer 304, a longer amount of time would be needed than in the previously described cases. Further, if the cache line has been locked and protected by software, regardless of the progress made in the cache write pipeline, a longer delay is expected.

Time ranges for delays can be determined based on the system architecture. For instance, delays to wait before retrying a cross-invalidate command can be classified as "short" if the cache line update is at the writeback controller 306, at the L1 cache 308, at the L2 cache write controller 310, or in-progress at the L2 cache 312. A delay can be classified as "medium" if the cache line update is at the store queue and buffer 304 when a cross-invalidate reject response 314 is issued in response to a cross-invalidate command. A delay can be classified as "long" if the cache line is locked by software. These relative values and other classifications can be mapped to encodings that represent time values. For example, a "short" delay can map to a lower number of counts, and a "medium" delay can map to a higher number of counts than the "short" delay but a lesser number of counts than a "long" delay. A fourth option can be "no delay", such that the four states can map to two bits of encoding.

Figure 4:
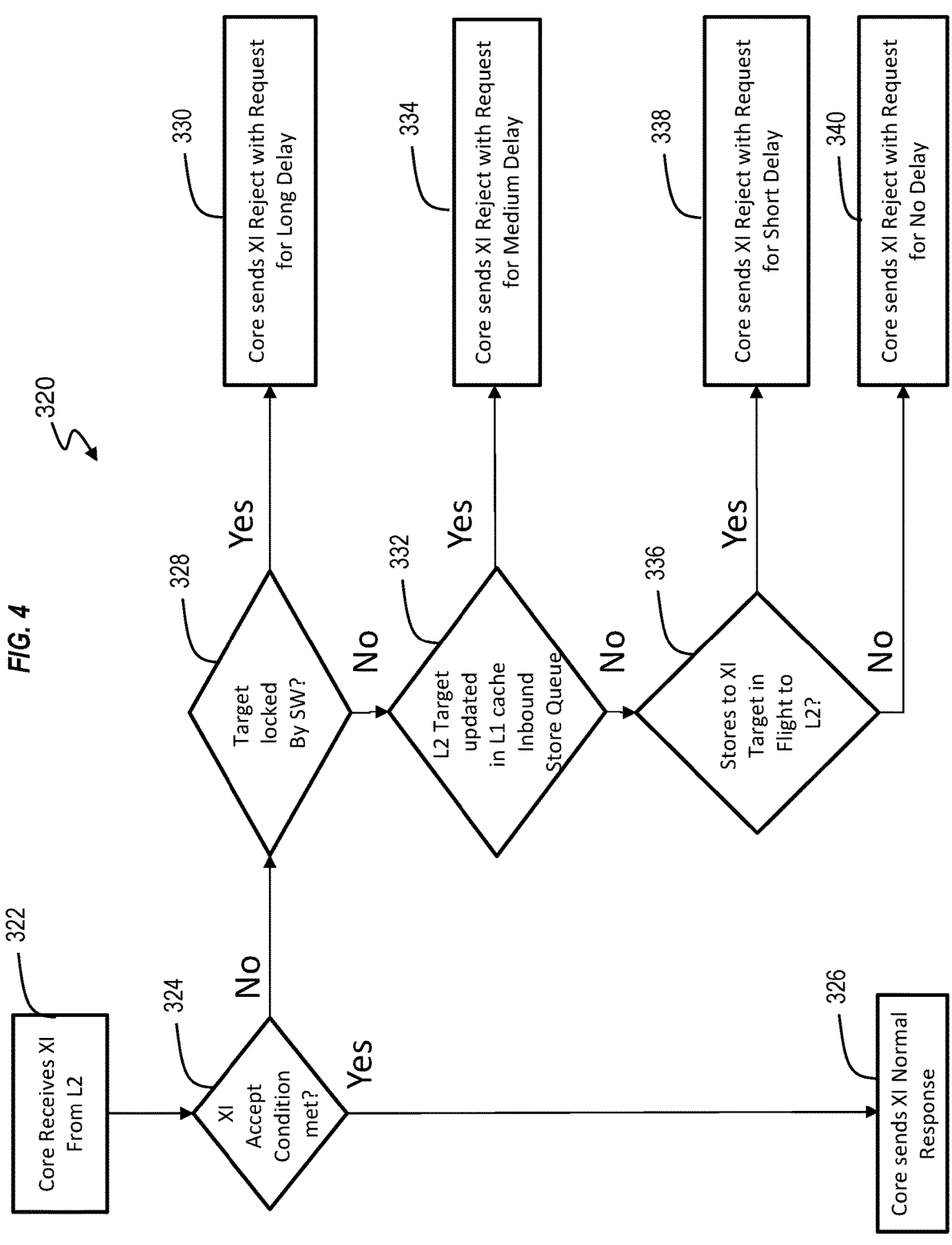
FIG. 4 is a flowchart of a process to be performed by a processor core for cross-core cache line contention management according to one or more embodiments of the present invention.

FIG. 4 is a flowchart of a process 320 to be performed by a processor core for cross-core cache line contention management according to one or more embodiments. The process 320 can be performed by firmware, circuitry, or any other type of controller in a processor core or associated with a processor core. In the example of FIG. 4, at block 322, a core receives a cross-invalidate command (XI) from a lower-level cache. For example, a core unit 302 within a core 205 can receive the XI from the L2 cache 312. At block 324, the core can determine whether an XI accept condition is met. If the XI accept condition is met, then the core can send an XI normal response at block 326. Otherwise, at block 328, the core can determine whether a cache target is locked by software.

If the cache target is locked by software, then the core can send an XI reject with a request for a long delay at block 330. If the cache target is not locked by software, then the core can determine whether a lower level target (e.g., an L2 target) is updated in a higher level cache inbound store queue (e.g., store queue and buffer 304) at block 332. If the lower level target is updated in the higher level cache inbound store queue, then the core can send an XI reject with a request for a medium delay at block 334. If the lower level target is not updated in the higher level cache inbound store queue, then the core can determine whether stores to XI target are in-flight to the lower-level cache (e.g., L2 cache) at block 336. If stores to XI target are in-flight to the lower-level cache, then the core can send an XI reject with a request for a short delay at block 338. Otherwise, if stores to XI target are not in-flight to the lower-level cache, then the core can send an XI reject with a request for no delay at block 340.

Although the example of FIG. 4 depicts decision blocks in a particular sequence, it will be understood that other variations are possible, including additional or fewer decision blocks.

Figure 5:
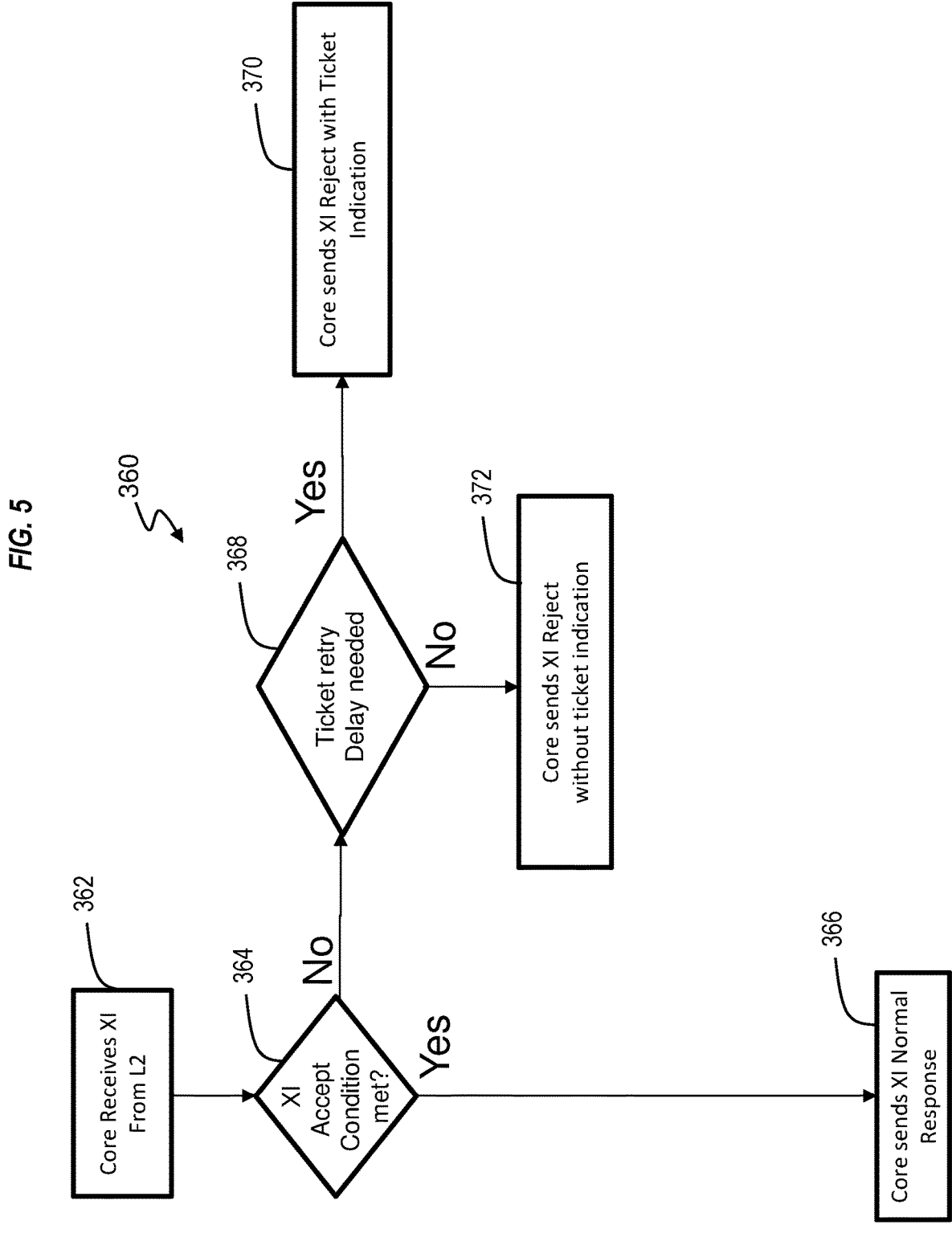
FIG. 5 is a flowchart of a process to be performed by a processor core for cross-core cache line contention management using a ticketing system according to one or more embodiments of the present invention.

FIG. 5 is a flowchart of a process 360 to be performed by a processor core for cross-core cache line contention management using a ticketing system according to one or more embodiments. The process 360 can be performed by firmware, circuitry, or any other type of controller in a processor core or associated with a processor core. In the example of FIG. 5, at block 362, a core receives an XI from a lower-level cache. For example, a core unit 302 within a core 205 can receive the XI from the L2 cache 312. At block 364, the core can determine whether an XI accept condition is met. If the XI accept condition is met, then the core can send an XI normal response at block 366. Otherwise, at block 368, the core can determine whether a ticket retry delay is needed. If a ticket retry delay is needed, then the core can send an XI reject with a ticket indication at block 370. If the ticket retry delay is not needed then the core can send an XI reject without a ticket indication at block 372. The ticket system and conditions are further described herein. As such, the process 360 can include additional decisions and actions beyond those depicted in the example of FIG. 5.

Figure 6:
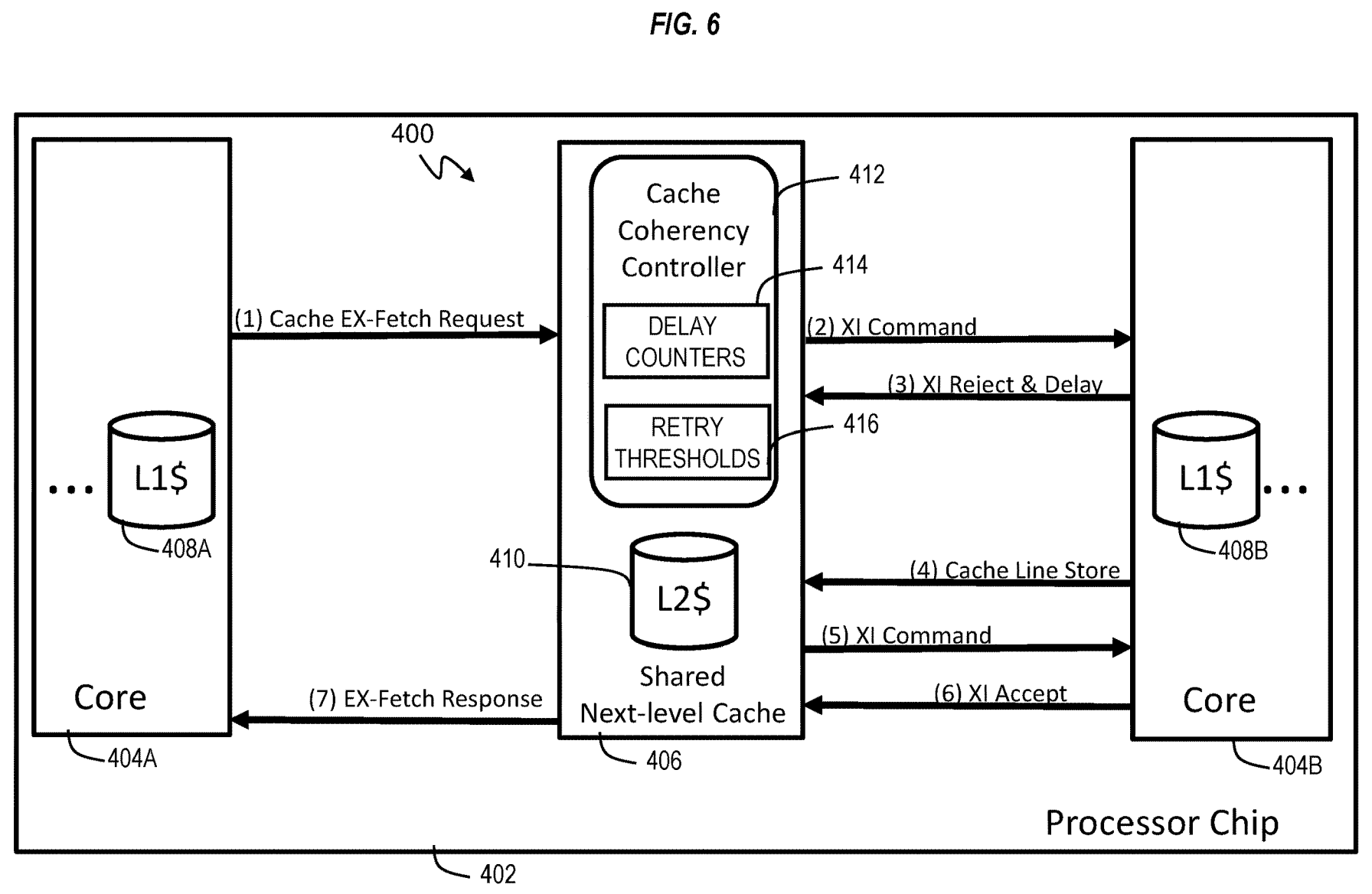

FIG. 6 depicts a block diagram illustrating an example of processor cross-core cache line contention management 400 between two L1 caches according to one or more embodiments. In the example of FIG. 6, a processor 402 includes a core 404A, a core 404B, and a shared next-level cache 406. The core 404A can include one or more L1 caches, such as L1 cache 408A, and the core 404B can include one or more L1 caches, such as L1 cache 408B. The shared next-level cache 406 can include an L2 cache 410 and a cache coherency controller 412. The processor 402 is an example of a processor chip 204 of FIG. 2. The cores 404A, 404B are examples of the cores 205 of FIG. 2, and the cache 408A, 408B, 410 can be the cache 206 of FIG. 2. Further, L1 cache 408A, 408B are examples of the L1 cache 308 of FIG. 3, and L2 cache 410 is an example of the L2 cache 312 of FIG. 3. Although the example of FIG. 6 depicts the L1 cache 408A, 408B within the same processor 402, it will be understood that the L1 cache 408A, 408B can be located anywhere that is accessible throughout a symmetric multiprocessing system, such as system 200, and need not be within the same processor 402.

The cache coherency controller 412 can include the L2 cache write controller 310 of FIG. 3. The cache coherency controller 412 can also include one or more delay counters 414 and one or more retry thresholds 416. The cache coherency controller 412 can include logic implemented in circuitry, firmware executable by circuits, and/or a combination of logic circuitry and firmware. Moreover, logic of the cache coherency controller 412 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, logic described herein can be a combination of hardware and programming. The programming can be processor executable instructions stored on a tangible memory, and the hardware can include processing circuitry for executing those instructions. Alternatively or additionally, logic can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Operation of the cache coherency controller 412 of FIG. 6 is further described with respect to process 500 of FIG. 7 as a computer-implemented method. The cache coherency controller 412 can receive a cache state change request, such as an exclusive state request from the L1 cache 408A. The cache state change request can be an exclusive state request; however, a requesting cache need not request the line exclusive in embodiments.

At block 502, the cache coherency controller 412 can send a cross-invalidate command to one or more caches, such as L1 cache 408B, based on receiving a cache state change request for a cache line in a symmetric multiprocessing system. The cache state change request can be received from L1 cache 408A of core 404A of a symmetric multiprocessing system, such as system 200 of FIG. 2. At least one of the one or more caches can include one or more L1 caches 408 of other cores 404 of the symmetric multiprocessing system. The cache line can be managed by a shared next-level cache 406, such as L2 cache 410, of the symmetric multiprocessing system.

At block 504, the cache coherency controller 412 can determine a retry delay based on receiving a cross-invalidate reject response from at least one of the one or more caches. The cross-invalidate reject response can be sent by core 404B of the symmetric multiprocessing system that is performing an operation on the cache line. The cross-invalidate reject response can include a retry indicator that defines a retry delay period.

At block 506, the cache coherency controller 412 can wait until a retry delay period associated with the retry delay has elapsed to resend the cross-invalidate command to the one or more caches. The core 404B can determine the retry delay period based on a predicted amount of time to complete an update of the cache line. For example, as described with respect to FIG. 3, a cache line update that has reached the store queue and buffer 304 will have a longer time to complete than a cache line update that has reached the L2 cache write controller 310. The cache coherency controller 412 can map a retry indicator encoded in the cross-invalidate reject response to a retry threshold 416 that defines the retry delay period, load a delay counter 414 with the retry delay period, and run the delay counter 414 until the retry delay period has elapsed. A shorter retry delay value can be set based on determining that the cache line is being written, and a longer retry delay value can be set based on determining that the cache line is in a locked and protected state. As an example, the retry indicator can be a 2-bit field and an encoding for a short amount of time can map to one value of the retry threshold 416 with a lower number of counts to load into the delay counter 414 than a medium time that maps to a larger value of the retry threshold 416 to load into the delay counter 414. Further, an encoding for a long time can map a largest value of the retry threshold 416 to load into the delay counter 414. The retry threshold 416 values need not map to the number of cycles but can be further modified, such as doubling the value to determine a number of delay cycles.

In some embodiments, the cache coherency controller 412 can receive an early restart command sent by the core 404B and resend the cross-invalidate command prior to the retry delay period elapsing based on the early restart command. The core 404B can send the early restart command based on detecting that the previously active operation being performed on the cache line completed or was aborted prior to the retry delay period elapsing. The cache coherency controller 412 need not be aware whether a cache line store was complete before sending another cross-invalidate command.

At block 508, the cache coherency controller 412 can grant the cache state change request for the cache line based on receiving a cross-invalidate accept response from the one or more caches, such as the L1 cache 408B. The grant of the cache state change request can allow the core 404A to propagate an update of the L1 cache 408A to the L2 cache 410.

FIG. 8 is a flowchart of a computer-implemented method 600 for providing processor cross-core cache line contention management using a ticket system according to one or more embodiments. Reference can be made to any of the figures discussed herein. The ticket system can inform the cache coherency controller 412 to wait until a corresponding message is received before resending a cross-invalidate command rather than using the delay counter 414. Alternatively, the delay counter 414 can be used as a backup, and a ticket can be used to terminate waiting earlier than by using the delay counter 414 alone.

At block 602, the cache coherency controller 412 can send a cross-invalidate command to one or more caches, such as L1 cache 408B, based on receiving a cache state change request for a cache line in a symmetric multiprocessing system. The cache state change request can be received from L1 cache 408A of core 404A of a symmetric multiprocessing system, such as system 200 of FIG. 2. The cache state change request can be an exclusive state request. At least one of the one or more caches can include one or more L1 caches 408 of other cores 404 of the symmetric multiprocessing system. The cache line can be managed by a shared next-level cache 406, such as L2 cache 410, of the symmetric multiprocessing system.

At block 604, the cache coherency controller 412 can determine a ticket identifier based on receiving a cross-invalidate reject response with a ticket code from at least one of the one or more caches. The ticket code can be a locally generated value by the core 404B. The ticket identifier can be determined by the cache coherency controller 412 based on the ticket code as a unique identifier in case multiple cores 404 issue the same ticket code. The cross-invalidate reject response can be sent by a core 404 of the symmetric multiprocessing system performing an operation on the cache line, and the core 404 can be configured to generate the ticket code and a wakeup message.

At block 606, the cache coherency controller 412 can wait until a wakeup message associated with the ticket identifier has been received to resend the cross-invalidate command to the one or more caches. The core 404B can be configured to send the wakeup message one or more cycles prior to completion of the operation on the cache line. Where a higher degree of timing adjustment is possible, the wakeup message can be sent a number of cycles early to align with an expected processing delay of the wakeup message (e.g., 3 cycles early where the number of cycles until the core 404B is ready for a cross-invalidate command is 3 cycles). In some embodiments, a delay counter 414 can be set to a default value based on receiving the cross-invalidate reject response, the delay counter 414 can be reset based on receiving the wakeup message, and the cross-invalidate command can be sent to the one or more caches based on the delay counter reaching a limit prior to receiving the wakeup message. The limit can be a maximum timeout period to ensure that the cache coherency controller 412 does not get hung up waiting indefinitely for a ticket.

At block 608, the cache coherency controller 412 can grant the cache state change request for the cache line based on receiving a cross-invalidate accept response from the one or more caches. The grant of the cache state change request can allow the core 404A to propagate an update of the L1 cache 408A to the L2 cache 410.

FIG. 9 is a block diagram of a system 700 according to embodiments of the invention. The system 700 includes processing circuitry 710 used to generate the design 730 that is ultimately fabricated into an integrated circuit 720 (e.g., processor chips 204) with processor cross-core cache line contention management. The steps involved in the fabrication of the integrated circuit 720 are well-known and briefly described herein. Once the physical layout 740 is finalized, based, in part, on being configured to use the processor cross-core cache line contention management according to embodiments of the invention, the finalized physical layout 740 is provided to a foundry. Masks are generated for each layer of the integrated circuit based on the finalized physical layout. Then, the wafer is processed in the sequence of the mask order. The processing includes photolithography and etch. This is further discussed with reference to FIG. 10.

Figure 10:
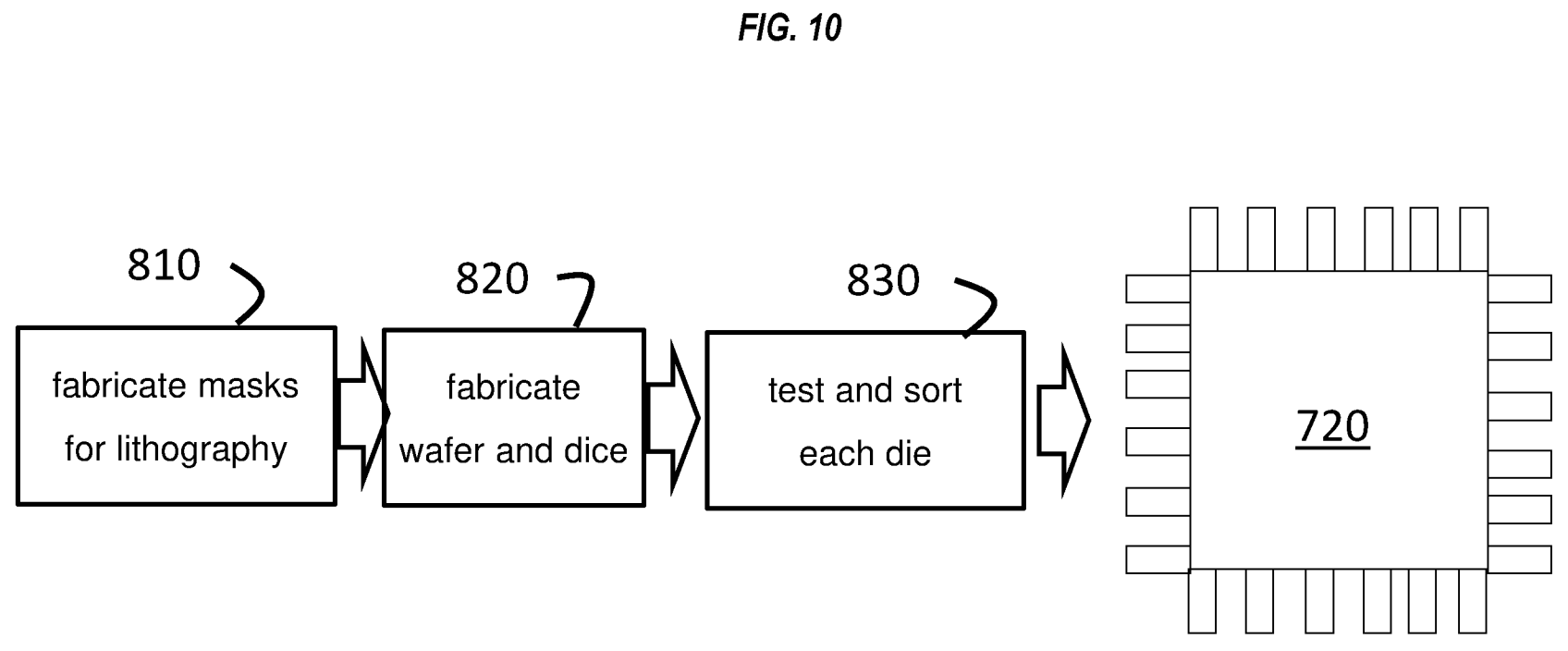

FIG. 10 is a process flow of a method of fabricating the integrated circuit according to exemplary embodiments of the invention. Once the physical design data is obtained, based, in part, on including processor cross-core cache line contention management in the processor chips 204, the integrated circuit 720 can be fabricated according to known processes that are generally described with reference to FIG. 10. Generally, a wafer with multiple copies of the final design is fabricated and cut (i.e., diced) such that each die is one copy of the integrated circuit 720. At block 810, the processes include fabricating masks for lithography based on the finalized physical layout. At block 820, fabricating the wafer includes using the masks to perform photolithography and etching. Once the wafer is diced, testing and sorting each die is performed, at block 830, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
sending a cross-invalidate command to one or more caches based on receiving a cache state change request for a cache line in a symmetric multiprocessing system;
determining a retry delay based on receiving a cross-invalidate reject response from at least one of the one or more caches;
waiting until a retry delay period associated with the retry delay has elapsed to resend the cross-invalidate command to the one or more caches; and
granting the cache state change request for the cache line based on receiving a cross-invalidate accept response from the one or more caches.

2. The computer-implemented method of claim 1, wherein the cache state change request is received from a higher-level cache of a core of the symmetric multiprocessing system, the at least one of the one or more caches comprises one or more higher-level caches of other cores of the symmetric multiprocessing system, and the cache line is managed by a lower-level cache of the symmetric multiprocessing system.

3. The computer-implemented method of claim 1, wherein the cross-invalidate reject response is sent by a core of the symmetric multiprocessing system performing an operation on the cache line.

4. The computer-implemented method of claim 3, wherein the core determines the retry delay period based on a predicted amount of time to complete an update of the cache line.

5. The computer-implemented method of claim 4, further comprising:
mapping a retry indicator encoded in the cross-invalidate reject response to a retry threshold that defines the retry delay period;
loading a delay counter with the retry delay period; and
running the delay counter until the retry delay period has elapsed.

6. The computer-implemented method of claim 1, further comprising:
receiving an early restart command; and
resending the cross-invalidate command prior to the retry delay period elapsing based on the early restart command.

7. The computer-implemented method of claim 1, wherein a shorter retry delay value is set based on determining that the cache line is being written, and a longer retry delay value is set based on determining that the cache line is in a locked and protected state.

8. A system comprising:
a plurality of processors each comprising two or more cores forming a symmetric multiprocessing system;
a cache system; and
a controller coupled to the cache system, the controller configured to:
send a cross-invalidate command to one or more caches of the cache system based on receiving a cache state change request for a cache line;
determine a retry delay based on receiving a cross-invalidate reject response from at least one of the one or more caches;
wait until a retry delay period associated with the retry delay has elapsed to resend the cross-invalidate command to the one or more caches; and
grant the cache state change request for the cache line based on receiving a cross-invalidate accept response from the one or more caches.

9. The system of claim 8, wherein the cache state change request is received from a higher-level cache of a core of the symmetric multiprocessing system, the at least one of the one or more caches comprises one or more higher-level caches of other cores of the symmetric multiprocessing system, and the cache line is managed by a lower-level cache of the symmetric multiprocessing system.

10. The system of claim 8, wherein the cross-invalidate reject response is sent by a core of the symmetric multiprocessing system performing an operation on the cache line.

11. The system of claim 10, wherein the core determines the retry delay period based on a predicted amount of time to complete an update of the cache line.

12. The system of claim 11, wherein the controller is further configured to:
map a retry indicator encoded in the cross-invalidate reject response to a retry threshold that defines the retry delay period;
load a delay counter with the retry delay period; and
run the delay counter until the retry delay period has elapsed.

13. The system of claim 8, wherein the controller is further configured to:
receive an early restart command; and
resend the cross-invalidate command prior to the retry delay period elapsing based on the early restart command.

14. The system of claim 8, wherein a shorter retry delay value is set based on determining that the cache line is being written, and a longer retry delay value is set based on determining that the cache line is in a locked and protected state.

15. A computer-implemented method comprising:
sending a cross-invalidate command to one or more caches based on receiving a cache state change request for a cache line in a symmetric multiprocessing system;
determining a ticket identifier based on receiving a cross-invalidate reject response with a ticket code from at least one of the one or more caches;
waiting until a wakeup message associated with the ticket identifier has been received to resend the cross-invalidate command to the one or more caches; and
granting the cache state change request for the cache line based on receiving a cross-invalidate accept response from the one or more caches.

16. The computer-implemented method of claim 15, wherein the cache state change request is received from a higher-level cache of a core of the symmetric multiprocessing system, the at least one of the one or more caches comprises one or more higher-level caches of other cores of the symmetric multiprocessing system, and the cache line is managed by a lower-level cache of the symmetric multiprocessing system.

17. The computer-implemented method of claim 15, wherein the cross-invalidate reject response is sent by a core of the symmetric multiprocessing system performing an operation on the cache line and the core is configured to generate the ticket code and the wakeup message.

18. The computer-implemented method of claim 17, wherein the core is configured to send the wakeup message one or more cycles prior to completion of the operation on the cache line.

19. The computer-implemented method of claim 17, wherein the wakeup message is sent a number of cycles early to align with an expected processing delay of the wakeup message.

20. The computer-implemented method of claim 15, further comprising:

setting a delay counter to a default value based on receiving the cross-invalidate reject response;

resetting the delay counter based on receiving the wakeup message; and resending the cross-invalidate command to the one or more caches based on the delay counter reaching a limit prior to receiving the wakeup message.

* * * * *